(12) United States Patent
Schroepfer et al.

(10) Patent No.: US 12,401,493 B2
(45) Date of Patent: Aug. 26, 2025

(54) PERFORMANCE BENCHMARKING WITH CASCADED DECRYPTION

(71) Applicant: SAP SE, Walldorf (DE)

(72) Inventors: Axel Schroepfer, Borthen (DE); Daniel Bernau, Karlsruhe (DE); Johannes Haasen, Trier (DE); Kilian Becher, Dresden (DE); Lars Baumann, Mannheim (DE)

(73) Assignee: SAP SE, Walldorf (DE)

( * ) Notice: Subject to any disclaimer, the term of this patent is extended or adjusted under 35 U.S.C. 154(b) by 303 days.

(21) Appl. No.: 18/059,343

(22) Filed: Nov. 28, 2022

(65) Prior Publication Data

US 2024/0178988 A1    May 30, 2024

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC .............................. H04L 9/008; H04L 9/0618
See application file for complete search history.

(56) References Cited

U.S. PATENT DOCUMENTS

| | | | |
|---|---|---|---|
| 11,050,725 B2 | 6/2021 | Becher et al. | |
| 11,250,140 B2 | 2/2022 | Tueno et al. | |
| 11,265,153 B2 | 3/2022 | Becher et al. | |
| 11,356,241 B2 | 6/2022 | Becher et al. | |
| 11,368,281 B2 | 6/2022 | Becher et al. | |
| 11,368,296 B2 | 6/2022 | Becher et al. | |
| 11,411,725 B2 | 8/2022 | Becher et al. | |
| 2020/0021568 A1* | 1/2020 | Becher | H04L 9/083 |
| 2020/0279045 A1 | 9/2020 | Tueno et al. | |
| 2021/0328762 A1 | 10/2021 | Becher et al. | |
| 2021/0328778 A1 | 10/2021 | Becher et al. | |
| 2021/0336764 A1 | 10/2021 | Becher et al. | |

(Continued)

FOREIGN PATENT DOCUMENTS

EP    3703304    9/2020

OTHER PUBLICATIONS

Cheon, "Bootstrapping for Approximate Homomorphic Encryption," In: Nielsen, J., Rijmen, V. (eds) Advances in Cryptology—EUROCRYPT 2018. EUROCRYPT 2018. Lecture Notes in Computer Science, vol. 10820. Springer, Cham, https://doi.org/10.1007/978-3-319-78381-9_14, 2018, 21 pages.

(Continued)

*Primary Examiner* — Vu V Tran
(74) *Attorney, Agent, or Firm* — Klarquist Sparkman, LLP

(57) ABSTRACT

A benchmarking service is engineered to provide computing performance metric benchmarks based on computing performance metrics provided from a variety of providers without being exposed to the underlying computing performance metrics. A homomorphic encryption scheme is used in a threshold cryptography scenario that allows aggregation of the computing performance metrics without decrypting the metrics. An independent decryption service can partially decrypt the benchmark, which can ultimately be decrypted to plaintext for use by the provider. Bitwise operations can be defined to address error problems, and the bitwise operations can be constrained to a smaller bit size to avoid proliferation of gates.

20 Claims, 9 Drawing Sheets

(56) References Cited

U.S. PATENT DOCUMENTS

| | | | |
|---|---|---|---|
| 2021/0336778 A1 | 10/2021 | Becher et al. | |
| 2021/0344489 A1 | 11/2021 | Becher et al. | |
| 2023/0025754 A1* | 1/2023 | Hassanzadeh | G06N 20/00 |
| 2024/0089083 A1* | 3/2024 | Race | H04L 9/008 |
| 2024/0089089 A1* | 3/2024 | Noam | H04L 9/0825 |

OTHER PUBLICATIONS

Gentry, "A fully homomorphic encryption scheme," PhD thesis, Stanford University, crypto.stanford.edu, 2009, 209 pages.

Boneh et al., "Threshold Cryptosystems from Threshold Fully Homomorphic Encryption." In: *Advances in Cryptology—CRYPTO 2018*, Lecture Notes in Computer Science, vol. 10991, Springer, Cham, eprint.iacr.org, 2018, 61 pages.

Solomon, "An Intro to Fully Homomorphic Encryption for Engineers," archived at https://web.archive.org/web/20210619185120/https://blog.nucypher.com/an-engineers-guide-to-fully-homomorphic-encryption/, Jul. 2, 2020, 15 pages.

Hallman et al., "Building Applications with Homomorphic Encryption, A Presentation from the Homomorphic Encryption Standardization Consortium," HomomorphicEncryption.org, on or before Sep. 1, 2022, 91 pages.

"SAP Process Insights," SAP SE, www.sap.com, on or before Aug. 10, 2022, 9 pages.

"SAP Solution in Detail: Public, Unleash the Power in Your Process Data with Process Mining," SAP Signavio, SAP SE, Jun. 2022, 11 pages.

"What is encryption? Data encryption defined," IBM, https://www.ibm.com/topics/encrytpion, Aug. 10, 2022, 5 pages.

Ducas et al. "FHEW: Bootstrapping Homomorphic Encryption in Less Than A Second," In *Annual International Conference on the Theory and Applications of Cryptographic Techniques,* 2015, 24 pages.

Chillotti, et al., "Faster fully homomorphic encryption: Bootstrapping in less than 0.1 seconds," In *Advances in Cryptology—ASIACRYPT 2016,* 2016, 30 pages.

\* cited by examiner

PERFORMANCE BENCHMARKING WITH CASCADED DECRYPTION

FIELD

The field generally relates to performance benchmarking in an encryption scenario.

BACKGROUND

Benchmarking is an important part of maintaining a high-performance enterprise environment. To achieve benchmarking, multiple independent sources of performance metrics are combined into an overall benchmark. For example, an average computation tends to indicate an acceptable ("average") level of performance.

However, a security problem arises when the performance metrics contain confidential or proprietary data. A benchmarking service can accept the metrics from different independent sources, but there remains a risk that the metrics are shared outside of the service, intentionally or otherwise. Encryption can be applied, but this leaves a problem of how to calculate the benchmark using encrypted data.

There therefore remains room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises, from a plurality of computing performance providers, receiving a plurality of encrypted computing performance metrics, wherein the encrypted performance metrics are encrypted according to a threshold homomorphic encryption scheme in which at least a benchmarking service and an independent decryption service contribute public encryption keys; aggregating the plurality of encrypted computing performance metrics while sustaining the threshold homomorphic encryption scheme, wherein the aggregating generates an encrypted aggregated computing performance metric benchmark encrypted according to the threshold homomorphic encryption scheme; and sending the encrypted aggregated computing performance metric benchmark to an independent decryption service server, wherein the independent decryption service server is configured to partially decrypt the encrypted aggregated computing performance metric benchmark with a private key of the independent decryption service and relay the partially decrypted aggregated computing performance metric benchmark to the benchmarking service.

In another embodiment, a system comprises a benchmarking service configured to receive a plurality of encrypted computing performance metrics, wherein the encrypted computing performance metrics are encrypted according to a threshold homomorphic encryption scheme in which at least a benchmarking service and an independent decryption service contribute public encryption keys; a homomorphic encryption aggregation service configured to aggregate the encrypted computing performance metrics while sustaining the threshold homomorphic encryption scheme, wherein the aggregating generates an encrypted aggregated computing performance metric benchmark encrypted according to the threshold homomorphic encryption scheme; and an independent decryption service configured to partially decrypt the encrypted aggregated computing performance metric benchmark with a private key of the independent decryption service and relay the partially decrypted aggregated computing performance metric benchmark to the benchmarking service; wherein the benchmarking service is further configured to fully decrypt the partially decrypted aggregated computing performance metric benchmark, and, over a network, send the fully decrypted aggregated computing performance metric benchmark to one or more computing performance providers.

In another embodiment, one or more non-transitory computer-readable media store computer instructions that when executed by a computing system cause the computing system to perform operations comprising from a plurality of computing performance providers, receiving a plurality of encrypted computing performance metrics, wherein the encrypted computing performance metrics are encrypted according to a threshold fully homomorphic encryption scheme in which at least a benchmarking service and an independent decryption service contribute public encryption keys; aggregating the plurality of encrypted computing performance metrics while sustaining the threshold fully homomorphic encryption scheme, wherein the aggregating generates an encrypted aggregated computing performance metric benchmark encrypted according to the threshold fully homomorphic encryption scheme via a virtual Boolean circuit that performs a bitwise operation on the plurality of encrypted computing performance metrics; and sending the encrypted aggregated computing performance metric benchmark to an independent decryption service server, wherein the independent decryption service server is configured to partially decrypt the encrypted aggregated computing performance metric benchmark with a private key of the independent decryption service and relay the partially decrypted aggregated computing performance metric benchmark to the benchmarking service.

As described herein, a variety of other features and advantages can be incorporated into the technologies as desired.

DETAILED DESCRIPTION

Example 1—Overview

Great strides have been made in computing technology in recent years. However, there remains a great deal of potential improvement in various areas, especially in the area of computing performance. The drive to innovate often comes from competition between organizations. As a result, enterprises are keen on knowing where they stand vis-à-vis their competitors. There thus remains a demand for computing performance benchmarks that give some idea of what acceptable (or at least average) performance looks like.

It is ordinarily a simple matter to collect information from a variety of sources and determine a benchmark. However, doing so while preserving confidentiality of individual metrics remains a problem, especially in an automated context.

An enterprise seeking to use a benchmarking service is forced to rely on a single trusted third party. In such a scenario, the benchmarking service has access to plaintext computing performance metrics that were shared with the benchmarking service, and intentional sharing or unintentional leaking of such metrics poses significant risk to the enterprise. This poses a dilemma because the enterprise may be willing to share the metrics on a confidential basis to reap the rewards of collective benchmarking but still wishes to avoid exposing the individual metrics.

As described herein, a homomorphic encryption scheme supports computation of benchmarks without exposing the underlying metrics as plaintext during the computation. To further protect the data, threshold cryptography can work in concert with the homomorphic encryption.

As a result, the amount of trust placed in the third-party benchmarking service can be reduced. In a threshold cryptography scenario, a single party cannot inspect the encrypted underlying data, intentionally or otherwise.

The benefits of such an arrangement include enhanced data security.

Further refinements to the technologies include supporting bootstrapping to reduce noise. Bitwise aggregation functions can be used. To reduce the proliferation of gates, the metrics can be represented in a reduced number of bits during application of a virtual Boolean circuit.

The technologies can automate the process of benchmarking so that it can be enjoyed by a greater number of enterprises and on a more timely basis.

The described technologies thus offer considerable improvements over conventional techniques.

Figure 1:
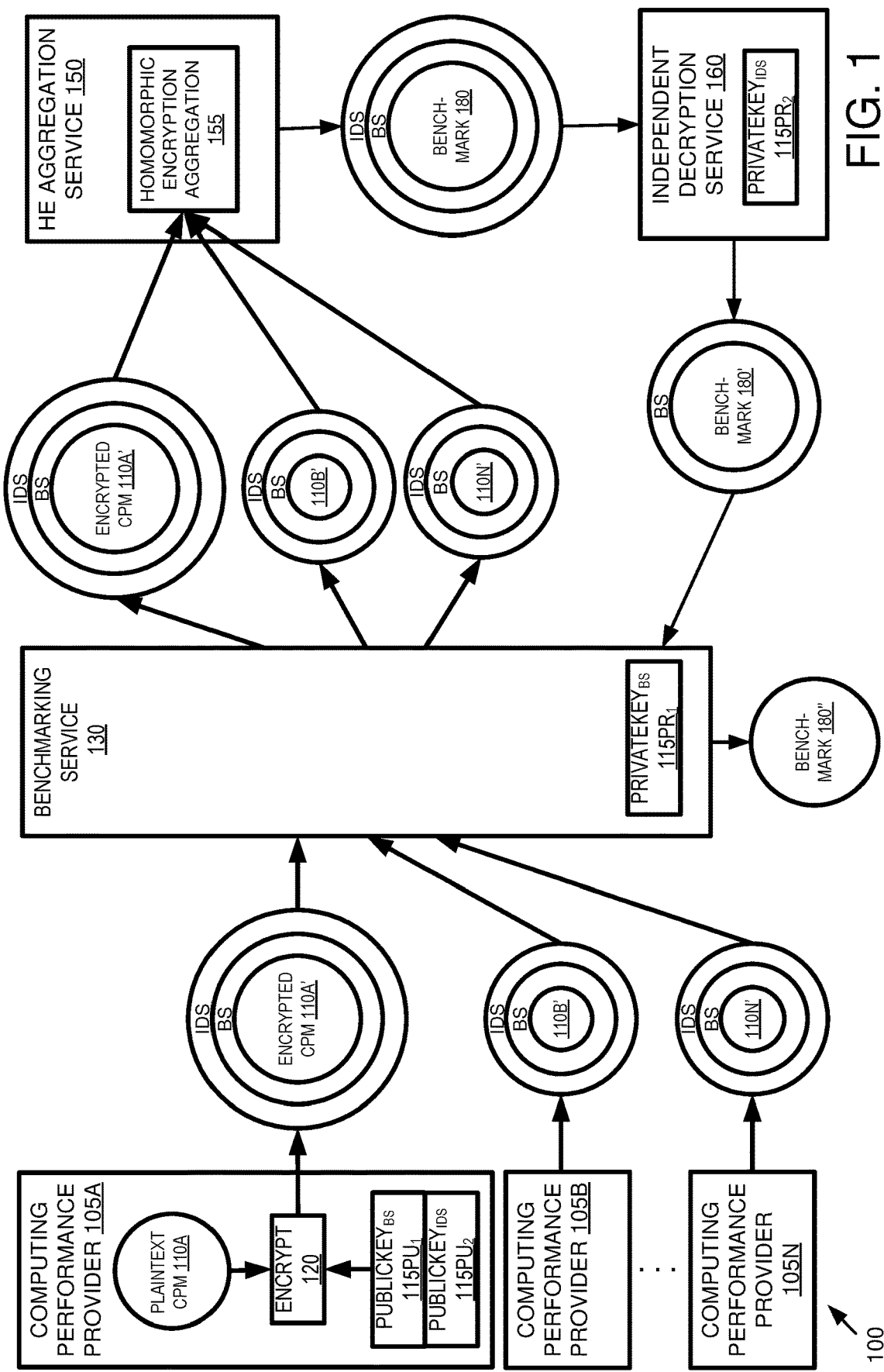
FIG. 1 is a block diagram of an example system implementing benchmarking with cascaded decryption.

Example 2—Example System Implementing Performance Benchmarking with Cascaded Decryption FIG. 1 is a block diagram of an example system 100 implementing performance benchmarking with cascaded decryption. In the example, a plurality of computing performance providers 105A-N have respective plaintext computing performance metrics (CPMs) (e.g., 110A) that are encrypted 120 according to a homomorphic encryption scheme that supports threshold decryption implemented at least with the public key of the benchmarking service $115PU_1$ and the public key of the independent decryption service $115PU_2$, yielding the encrypted CPMs 110A'-N', which are communicated to the benchmarking service 130.

Although the drawing shows layers of encryption for purposes of illustration, in practice, encryption can be performed with a combination of a plurality of public keys (e.g., $115PU_1$ and $115PU_2$). Although two parties are shown, public keys of additional parties (decryptors) can be incorporated as described herein.

The benchmarking service 130 can then send the encrypted CPMs 110A'-N' to the homomorphic encryption aggregation service 150 that is configured to aggregate the encrypted CPMs with a homomorphic encryption aggregation function 155, which yields the encrypted benchmark 180. As shown, the encrypted benchmark 180 continues to employ the threshold decryption where both the benchmarking service 130 and the independent decryption service 160 are decryptors; neither one can decrypt alone. The independent decryption service 160 is configured to receive the encrypted benchmark 180 and partially decrypt it with the private key $115PR_2$, yielding the partially decrypted benchmark 180'. The benchmarking service 130 is configured to receive the partially decrypted benchmark 180' and completely decrypt it using the private key $115PR_1$, yielding the plaintext benchmark 180".

The plaintext benchmark 180" can then be communicated back to the computing performance providers 105A-N for use (e.g., to compare against their respective metrics and take appropriate action).

The system 100 and any of the other systems described herein can be implemented in conjunction with any of the hardware components described herein (e.g., processing units, memory, and the like). In any of the examples herein, the computing performance metrics, 110A-N, benchmark 180, keys, and the like, can be stored in one or more computer-readable storage media or computer-readable storage devices. The technologies described herein can be generic to the specifics of operating systems or hardware and can be applied in any variety of environments to take advantage of the described features.

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, in practice, a plurality of different metric types from a variety of computing performance providers can be supported. Also, although only one independent decryption service is shown, additional independent decryption services can be added into a chain to add greater security if desired. Their public keys can be incorporated into the overall public key used to encrypt the plaintext computing performance metrics.

The described computing systems can be networked via wired or wireless network connections, including the Internet. Alternatively, systems can be connected through an intranet connection (e.g., in a corporate environment, government environment, or the like). The computing systems can be implemented in the same computer or location or can be implemented on multiple computers in multiple locations connected in a distributed computing environment such as the cloud computing environment described herein. However, as noted, independence (e.g., separate control) can be maintained for decryptors (e.g., between the independent decryption service and the benchmarking service; or between the decryptors in a larger chain of a plurality of decryptors).

Although separate computing systems are shown, in practice, the benchmarking service 130 can be combined with the aggregation service 150. Similarly, the aggregation service 150 can be combined with the independent decryption service 160. In some implementations, the benchmarking service 130 can be bypassed. However, in practice the threshold decryption arrangement uses two or more separate parties to preserve security of the data. Although the benchmarking service 130 and the independent decryption service 160 are shown, any two independent parties can participate in the system as decryptors to achieve the data security provided by the technologies. Additional parties can be added as described herein.

Figure 2:
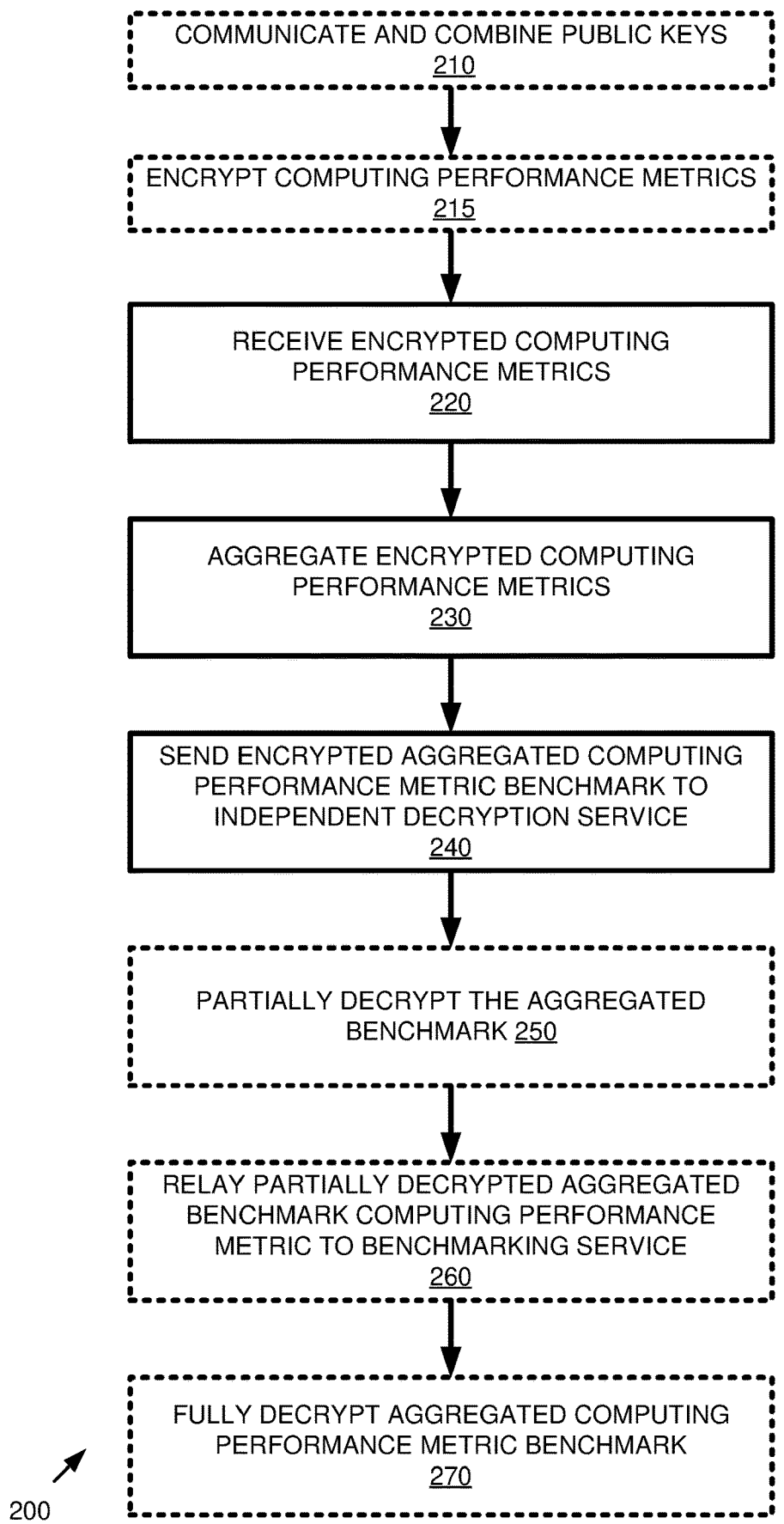
FIG. 2 is a flowchart of an example method of performance benchmarking with cascaded decryption.

Example 3—Example Method of Performance Benchmarking with Cascaded Decryption FIG. 2 is a flowchart of an example method 200 of performance benchmarking with cascaded decryption and can be implemented, for example, by the system of FIG. 1. The method can be for providing aggregated benchmarks while protecting data privacy.

Certain preliminary actions such as the generation of public/private key pairs are not shown and can take place beforehand.

As part of configuration, at 210 the public keys of a benchmarking service and an independent decryption service can be communicated and combined to computing performance providers.

As part of preparation, at 215, the computing performance metrics are encrypted according to a homomorphic encryption scheme that supports threshold cryptography (e.g., a threshold homomorphic encryption scheme) with the combined public keys of the benchmarking service and the independent decryption provider. Thus, the plurality of encrypted computing performance metrics can be encrypted with a combined key, wherein the combined key is based on (e.g., combined from) at least a public key of the benchmarking service and a public key of the independent decryption service. Additional parties with additional public keys can be added as described herein.

At 220, the encrypted computing performance metrics are received. As shown herein, such action can be performed by the benchmarking service. The encrypted computing performance metrics can then be relayed to an aggregation service (e.g., external or internal to the benchmarking service). In practice, the benchmarking service can be bypassed such that the aggregation service performs the receiving.

At 230, the encrypted computing performance metrics are aggregated, yielding an encrypted benchmark. Aggregating is performed while sustaining the threshold homomorphic encryption scheme (e.g., the aggregated result can still be decrypted) and generates an encrypted aggregated computing performance metric benchmark encrypted according to the threshold homomorphic encryption scheme. As described herein, aggregating the plurality of encrypted computing performance metrics can comprise calculating an average (or other benchmark as described herein) with a bitwise operation on the plurality of encrypted computing performance metrics. Calculating the average with the bitwise operation can comprise applying a definition of a virtual Boolean circuit in a homomorphic encryption calculation as described herein. As described herein, aggregating can comprise applying bootstrapping during an aggregation calculation (e.g., to reduce noise in the ciphertext).

At 240, the encrypted benchmark is sent to an independent decryption service, which can be configured to perform 250-260. For example, the encrypted benchmark can be sent over a network connection.

At 250, the benchmark is partially decrypted with the private key of the independent decryption service.

At 260, the partially decrypted benchmark is relayed to the benchmarking service, which is configured to perform 270. Again, the benchmark can be sent over a network connection.

At 270, the benchmark is fully decrypted (e.g., by the benchmarking service). The plaintext benchmark can then be provided for use. For example, the fully decrypted aggregated computing performance metric benchmark can be sent over a network to at least one of the computing performance providers.

As described herein, the benchmark can then trigger additional processing or actions. For example, when the encrypted performance metrics comprise respective encrypted versions of plaintext computing performance metrics. the decrypted aggregated computing performance metric benchmark can be compared with a plaintext computing performance metric out of the computing performance metrics (e.g., an enterprise compares their own metric value to the benchmark). Responsive to determining that the aggregated computing performance metric benchmark differs from the encrypted computing performance metric out of the encrypted computing performance metrics (e.g., by at least a threshold amount or percentage), an alert can be sent. For example, a warning or alert can be sent to an administrator, who can take steps to correct the performance issue. Such issues may arise from faulty hardware, insufficient computing resources, software defects, process defects, or the like. In other performance contexts, other solutions may be appropriate (e.g., reengineering a workflow of the like).

The illustrated actions can be described from alternative perspectives while still implementing the technologies. For example, receiving a metric can be described as sending a metric depending on perspective.

Example 4—Example Computing Performance Metrics

In any of the examples herein, computing performance metrics can indicate the performance of an automated process. In practice, such processes can range from query processing to completion of an automated process, which is measured by a process performance indicator (e.g., indicating performance of inventory processes, accounting processes, or other processes). The metrics can take the form of a simple measurement (e.g., seconds, hours, days, units, or the like), a percentage (e.g., percent success, failure rate, compliance rate, or the like), or some other metric of performance. Key performance indicators (KPIs) such as order to cash time, inventory, and the like can also be used.

Other examples of computing performance metrics include hire-to-retire human resources and workforce analytics such as hiring times, diversity in workforce, and the like. The process duration for manual tasks such as vendor creation (e.g., "cycle time") can be a KPI that is used as a computing performance metric. Different domains can have different performance indicators. For example, in an insurance scenario, a comparison of damage claims can be a key performance indicator. As described herein, organizations are interested in knowing how they compare vis-à-vis other organizations. The technologies described herein are therefore helpful to enable such comparison by allowing calculation of a computing performance metric benchmark without exposing the underlying metrics during the calculation process. Such metrics can comprise confidential information that the provider wishes to keep confidential for business, legal, or compliance reasons.

Further automation can be achieved by extending cloud applications to automatically collect such metrics. In a cross-tenant scenario, a cloud service provider can collect such metrics automatically with consent of the enterprise for which the metric is being collected. Thus, benchmarking can be fully automated while preserving security of the underlying metrics.

Example 5—Example Computing Performance Providers

In any of the examples herein, computing performance providers can take the form of computing systems of an enterprise wishing to avail itself of the benchmarks provided by the technologies described herein. In practice, a cloud computing provider can provide computing services to such enterprises, so they are in effect, customers of the cloud computing provider. Such computing performance providers can be tenants of a multi-tenant system in a cloud computing environment.

As described herein, such providers can opt to participate in automated collection of performance metrics, minimizing the amount of effort required for them to take advantage of the benchmarks described herein.

In the context of the technologies, the cloud computing performance providers take the form of one or more computing systems of an enterprise, whether in an on-premises or cloud computing environment. Such computing systems can collect the described metrics, encrypt them, and provide the encrypted metrics as described herein. In practice, the benchmarking service can manage such computing systems on behalf of the enterprise in a cloud computing environment.

Example 6—Example Benchmarking Service

In any of the examples herein, a benchmarking service can take the form of one or more computing systems that enterprises can interact with to obtain computing performance metric benchmarks as described herein. The benchmarking service can comprise the homomorphic encryption aggregation service, or such a service can be delegated to another entity.

In practice, the benchmarking service can be positioned as a cloud computing provider because such an arrangement provides synergies with other offerings and capabilities.

Example 7—Example Computing Performance Metric Benchmark

In any of the examples herein, a computing performance metric benchmark can take the form of an aggregation of computing performance metrics from different sources. Such benchmarks can be an average, mean, mode, maximum, minimum, variance, or the like. Other more specialized benchmarks can be supported (e.g., average after discarding highest and lowest x metrics, min/max, or the like).

In practice, a mathematical calculation can be used to arrive at the benchmark (e.g., an average can be calculated by summing the metrics and dividing by the number of sources). Optimizations of such calculations can include reducing the amount of calculation or logic gates to arrive at the benchmark, given the input metrics.

Example 8—Example Homomorphic Encryption

In any of the examples herein, a homomorphic encryption scheme can be used to encrypt metrics. Fully or semi-homomorphic encryption can be used. Homomorphic encryption provides an operation on ciphertexts (e.g., encrypted data) that yields a result ciphertext that essentially mimics operations on the underlying plaintexts. An encryption scheme is homomorphic if it offers at least one operation on ciphertexts that maps to a homomorphic operation on the underlying plaintexts. Thus, aggregate computations can be performed on encrypted computing performance metrics, without exposing the plaintext metric. For example, multiplying two ciphertexts yields a result ciphertext with the product of the computation without exposing the plaintext. Aggregate benchmarks such as average, mean, and median can be computed over provider-encrypted metrics, avoiding the ability and risk related to the use of plaintext metrics from the benchmarking service.

Common homomorphic operations are addition and multiplication. Partially (semi) homomorphic encryption schemes can provide either addition or multiplication, while fully homomorphic encryption schemes can provide both addition and multiplication.

Homomorphic encryption schemes may support different models of computation, including Boolean computations (AND, XOR) and modular computations (addition, multiplication). Homomorphic encryption schemes that support modular computations may be further classified as to whether they support integer or floating-point arithmetic. Homomorphic encryption schemes that support Boolean computations allow for the construction of virtual Boolean circuits. Such Boolean models can support diverse computations including sorting, median, and other aggregate metrics that can be useful in a computing performance metric context.

Fully homomorphic encryption schemes typically achieve homomorphic computation while preserving security at the cost of adding noise into the ciphertext. The noise may be reduced by the introduction of a bootstrapping step after a computation on the ciphertexts. Such bootstrapping can be enabled by providing a hint about the private key portion of the encryption. The hint permits noise reduction, while not allowing full decryption of the ciphertext.

In practice, the technologies can operate independently of the specific homomorphic encryption scheme. Example schemes include FHEW, TFHE, and the like.

In practice, noise can be introduced with encryption. A problem is that the noise can grow with successive homomorphic operations. If the noise grows too large, correct decryption of the ciphertexts can be impossible or very unlikely, which defeats the purpose of the computation (e.g., a benchmark). Bootstrapping can be used to keep such noise below a desired level (e.g., such that decryption yields the correct plaintext).

Example 9—Example Semi Homomorphic Encryption

In any of the examples herein, semi (partially) homomorphic encryption can be used. Such schemes typically provide either addition or multiplication. In general, such functions can be sufficient if the aggregation function used for benchmarking can be computed using only (either) addition or multiplication, or if some part of the function can be computed in plaintext without sacrificing security. For example, average could be computed with a partially homomorphic encryption scheme with an additive homomorphism (e.g., Paillier's encryption scheme) by homomorphically computing the sum of the inputs and later dividing the benchmark result in plaintext by the number of inputs (e.g., if homomorphic division is not provided in such a case).

Such a technique can be performed by the benchmarking service. A threshold version of the partially homomorphic encryption can be implemented.

For an implementation using virtual gates, the circuits that are evaluated homomorphically can consist of one type of gate rather than two kinds of gates (e.g., XOR gates for the Goldwasser Micali cryptosystem). Thus, the capabilities of the homomorphic encryption service are limited in that it cannot evaluate arbitrary arithmetic functions. Computation of mean, however, is still possible. The same applies to any function that can be represented as a circuit that consists entirely of XOR or AND gates.

Partially homomorphic encryption schemes typically do not use noise in the ciphertexts to ensure confidentiality of the underlying plaintexts. Therefore, the considerations regarding noise reduction and bootstrapping can be avoided for partially homomorphic encryption schemes. However, the considerations regarding circuit-size reduction (e.g., total number of gates or depth of the circuit) can still apply.

Partially homomorphic encryption schemes typically perform the computation of homomorphic operations much faster than fully homomorphic encryption schemes. Therefore, if a benchmark computation is performable by a circuit that can be constructed using only one type of gate (e.g., computation of the sum of confidential inputs as a basis for mean computation), the partially homomorphic encryption approach can allow for more efficient benchmark computation.

Thus, an implementation can switch between partially homomorphic encryption and fully homomorphic encryption depending on the target benchmarking function to increase efficiency (e.g., faster completion time, lower CPU consumption, lower memory consumption, smaller amounts of data being transferred such as smaller keys and ciphertexts, and lower energy consumption). Responsive to determining that the benchmark computation can be performed by a partially homomorphic encryption scheme, a partially homomorphic encryption scheme can be used instead of a fully homomorphic encryption scheme. Subsequently, a system can use a fully homomorphic encryption scheme as appropriate.

Example 10—Example Threshold Decryption

In any of the examples herein, homomorphic encryption can be used in combination with threshold cryptography (which enables "cascaded decryption") to encrypt metrics. In threshold cryptography, a defined set of actors each hold a share of the decryption key. Each of the decryption actors ("decryptors") can partially decrypt the encrypted result. In cascaded decryption, the decryptors partially decrypt the encrypted result in sequential order, although a particular order is not necessary. The last decryption actor ultimately obtains the result in plaintext. For threshold cryptography within an initial setup phase, each decrypting party creates a public key/private key pair. A global public key is created from the public keys. The global public key is shared with the metric providers and used by the providers to encrypt their metrics.

The resulting ciphertexts can be transferred to the benchmarking service as shown. With the benchmarking service private key alone, decryption is impossible due to threshold cryptography. After the homomorphic encryption aggregation service computes over the encrypted metrics, the resulting benchmark is decrypted partially by the chain of decryption decryptors (e.g., parties).

The chain comprises at least one independent party besides the benchmarking service to prevent decryption by the benchmarking service. As shown in examples, an independent decryption service under separate control can be used. However, additional decryptors can be placed in the chain as desired. For example, one or more additional independent decryption services can be configured to partially decrypt the aggregated computing performance metric benchmark with respective private keys of the additional independent decryption service and relay the partially decrypted aggregated computing performance metric benchmark to the next decrypting party in a chain of decrypting decryptors.

Example 11—Example Independent Decryption Service

In any of the examples herein, an independent decryption service can be used to preserve security of the data in a threshold decryption arrangement. Threshold decryption involves multiple parties to decrypt the encrypted data. For example, a combined encryption key that incorporates to public keys can be used to encrypt the data. Decryption specifies that at least a threshold number of private keys (e.g., two) have to be used to decrypt the data. Thus, if the independent decryption service is independent from the benchmarking service, neither the benchmarking service nor the independent decryption service alone can observe the encrypted computing performance metrics. Thus, absent any collusion between the parties, neither party has access to the underlying metrics.

After the benchmark is computed, both parties work in conjunction to decrypt it to plaintext. Such plaintext can then be provided (e.g., to the computing performance providers) without ever having to expose the underlying metrics on which the benchmark is based.

Example 12—Example System Implementing Bitwise Aggregation Computation

Figure 3:
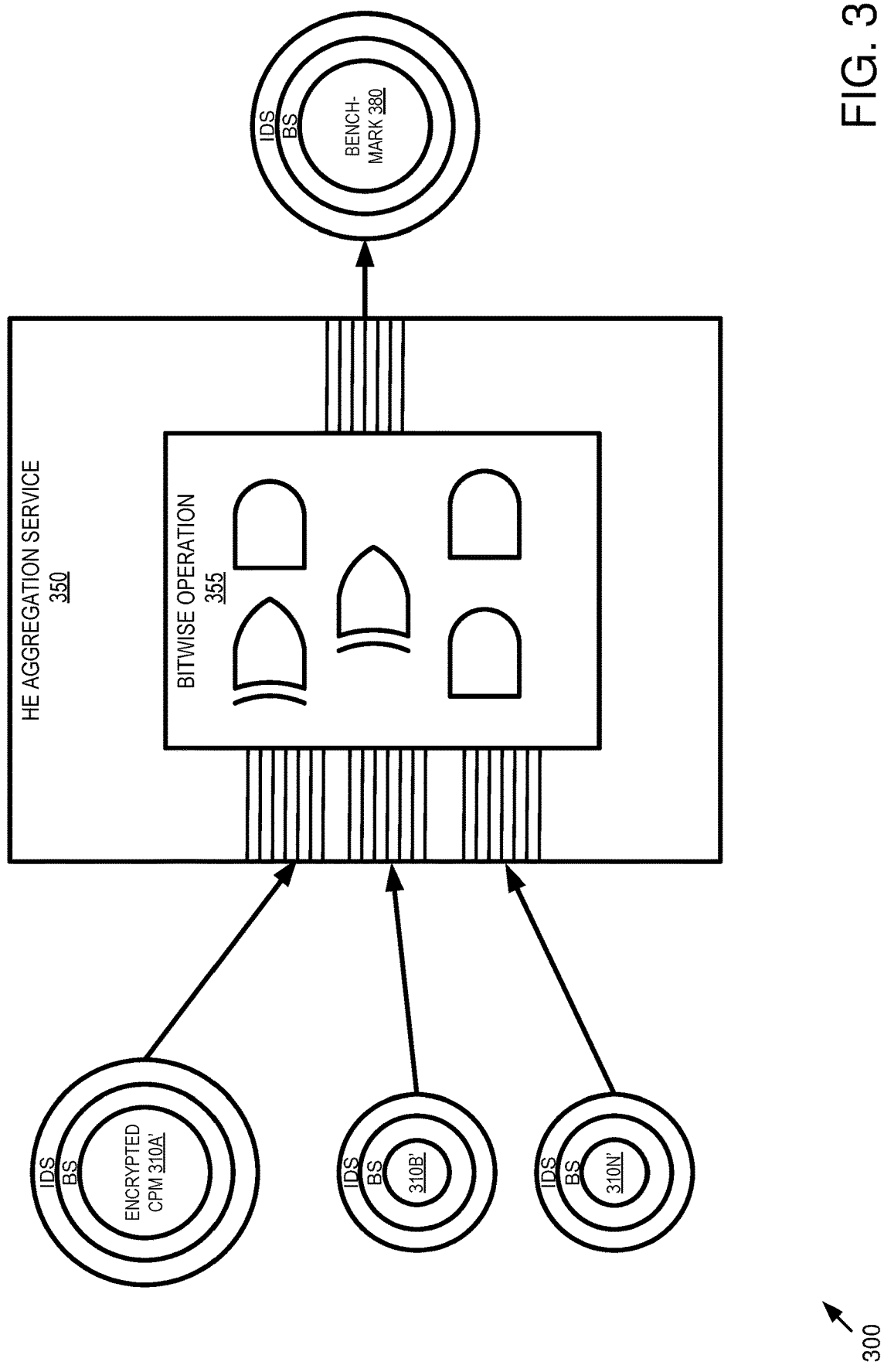
FIG. 3 is a block diagram of an example system implementing a bitwise aggregation computation in a homomorphic encryption scenario.

FIG. 3 is a block diagram of an example system 300 implementing a bitwise aggregation computation. In the example, a homomorphic encryption aggregation service 350 is configured to perform a bitwise operation represented by the bitwise operation representation 355 on the input encrypted computing performance metrics 310A'-N', resulting in the benchmark 380.

As described herein, the bitwise operation executed by the bitwise operation representation 355 can be constrained to have a minimum number of input bits needed to perform the desired computation (e.g., percentages). Fewer bits leads to fewer gates, which leads to more efficient computation overall as described herein. Using the bitwise approach described herein allows fine tuning of the computation to precisely fit the computing needs, resulting in higher performance compared to a generalized approach that uses standard integer representations found in conventional programming languages. Thus, responsive to receiving a number of bits, n, a bitwise operation representation implementing incoming metrics of n bits can be output, and the resulting virtual Boolean circuit (e.g., represented by the representation) can be used to calculate the aggregated metrics as described herein. Thus, in any of the examples herein, the inputs to the virtual Boolean circuit (e.g., the metrics) can be constrained to a specified bit size.

Mapping a higher-level operation (e.g., used to calculate a benchmark) comprises representing the operation as a virtual Boolean circuit. A generator component can output a virtual Boolean circuit for average (e.g., based on full adders) and median (e.g., based on bubble sort as a suitable sorting algorithm—content-independent number of invariants).

The use of bitwise operations provides more flexibility in terms of input length, number of inputs, and the aggregation function being computed. A dedicated Boolean circuit can be engineered for a particular scenario. Such a circuit can be more optimal in terms of the number of gates or circuit depth than a general Boolean circuit.

Bootstrapping can be used to reduce noise arising from the homomorphic encryption scheme.

In practice, the bitwise operation representation 355 can take the form of a representation of gates (e.g., AND, XOR, or the like). The bitwise operation representation 355 thus comprises a virtual Boolean circuit dedicated to the perform the benchmark computation. In some cases, a generic computing engine can apply the representation 355 to the inputs 310A'-N'. Or, dedicated code can be generated to effectively apply the representation 355 to the inputs 310A'-N'. In any case, the aggregated benchmark 380 is calculated without exposing the inputs 310A'-N' as plaintext.

To reduce the proliferation of gates in the bitwise operation 350, the input computing performance metrics can be converted to a format that reduces the number of bits. For example, the encrypted metrics can be presented in an n-bit format for the bitwise operation, where n has a value between 5 and 10 inclusive. N can have a value of 7. As described herein, the metrics can be represented as percentages. Metric representations can be limited to whole numbers (e.g., integers representing percentages or other metrics), avoiding floating point formats, and the like, again as a way to limit the proliferation of gates.

Fewer bits (e.g., the minimum for a particular use case) means fewer gates, which in turn means fewer homomorphic operations and therefore slower noise growth or less noise. Slower noise growth means smaller demand for bootstrapping, which makes the overall computation more efficient. Some schemes, like TFHE, perform bootstrapping after each gate. So, fewer gates in such a scenario again results in more efficient computation.

Bootstrapping is a computationally complex operation that reduces the noise of a ciphertext. In bootstrapping, the decryption function of the encryption scheme is translated into a circuit called a "bootstrapping circuit." The circuit is homomorphically evaluated when given inputs of the encrypted secret key and the ciphertext. The computation yields a so-called "fresh" encryption of the original plaintext (e.g., the new ciphertext contains less noise than the original ciphertext). Otherwise, noise grows with successive homomorphic operations. If the amount of noise in a ciphertext grows too large, correct decryption can no longer be guaranteed, which limits the complexity of homomorphic computations that can be performed. Thus, applying bootstrapping allows for further homomorphic operations. Consequently, by applying bootstrapping on a regular basis (e.g., right before the noise grows too large), one can evaluate an arbitrary number of computation gates (e.g., arbitrarily complex benchmarking computations with large amounts of inputs, complex statistics, or both).

Example 13—Example Method of Performing Bitwise Aggregation Computation

Figure 4:
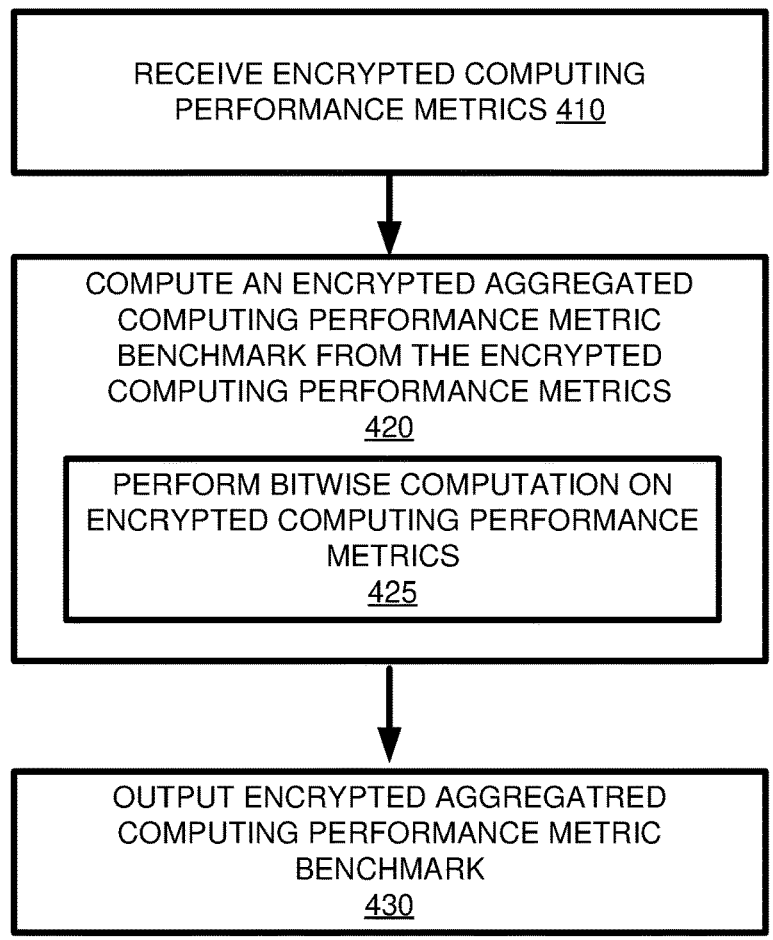
FIG. 4 is a flowchart of an example method of implementing a bitwise aggregation computation in a homomorphic encryption scenario.

FIG. 4 is a flowchart of an example method 400 of performing a bitwise aggregation computation and can be performed, for example, by the system (e.g., service 350) of FIG. 3.

At 410, a plurality of encrypted computing performance metrics is received.

At 420, an encrypted aggregated computing performance metric benchmark is computed from the encrypted computing performance metrics under a homomorphic encryption scheme. In such a case, the inputs and outputs remain encrypted. Such computing can comprise performing 425 a bitwise computation on the encrypted computing performance metrics. In practice, a definition of a bitwise computation (e.g., the logic gates) can be implemented to develop programming code that will perform such a computation while sustaining the encryption scheme. Thus, performing the bitwise computation comprises executing programming code developed from a definition of the bitwise computing (e.g., logic gates).

In any of the examples herein, aggregating the plurality of encrypted computing performance metrics can comprise applying a virtual Boolean circuit definition that sustains the threshold homomorphic encryption scheme in the encrypted aggregated benchmark computing performance metric (e.g., as explained in the description of FIG. 3).

At 430, the benchmark is output.

Example 14—Example Detailed Method

Security and compliance concerns arise when cloud applications for business process management and analytics are extended with cross-customer benchmarking features, especially since users commonly must share their process performance indicators (PPIs) with a central benchmarking service to receive aggregate benchmarks reflecting the business process performance of a peer group in exchange. While aggregate benchmarks can be considered anonymous if the underlying group of users is large, the individual PPIs that are shared with the benchmarking service for aggregation reveal confidential information with respect to individual users. Technologies described herein can use a homomorphic encryption scheme with threshold decryption to obtain confidential benchmarking, in which the benchmarking service can still calculate plaintext benchmarks but loses the ability to learn individual plaintext PPIs. The inability of the benchmarking service to observe or inspect individual plaintext PPIs due to encryption allows analysis over highly sensitive user PPIs at reduced risk and, therefore, overcomes the need for users to trust the benchmarking service with respect to confidentiality and integrity (i.e., no plaintext aside from aggregate benchmarks can be computed).

In any of the examples herein, a homomorphic encryption (HE) scheme can overcome the benchmarking service's reliance on individual plaintext PPIs for computing aggregate benchmarks.

Computing performance providers (i.e., customers) share encrypted PPIs (encrypted with a global public encryption key) with the benchmarking service. The benchmarking service sends encrypted PPIs to an HE service for computation. Threshold decryption is performed first by the HE service and second by the benchmarking service. Any two (or more) independent parties can perform the threshold decryption so that neither one of them alone can observe or inspect individual plaintext PPIs.

In practice, confidential benchmarking can employ asymmetric HE (i.e., public-key cryptography), and provide a cloud application provider benchmarking service that only gets HE encrypted PPIs as inputs and computes aggregate benchmarks such as average and median without the possibility for any intermediate decryption.

In an example embodiment, the process calculates statistics, such as average and median. That is, the underlying algorithm is summing up and dividing by number of elements, and sorting and choosing the central element, respectively. HE schemes on the lowest level typically provide only two basic operations: addition or multiplication, or both, from which higher-level operations can be composed. Performing the calculation in an efficient way is important because the number of operations will have a direct impact on the running time. Moreover, to keep a high level of flexibility, one can choose an HE scheme where one does not need to know the number of inputs (PPIs) and, thus, number of operations, at design time.

This requirement works in harmony with bootstrapping (an operation for reducing the noise that is inherent in the ciphertext, grows with each operation, and renders the ciphertext to be no longer decryptable if it exceeds a certain noise level). Respective HE schemes typically provide addition or multiplication, or both, on just bit-level, i.e., provide evaluation of XOR and AND. Mapping a higher-level operation for the benchmarking can be achieved by representing the operation as a (virtual) Boolean Circuit. A generator component in the approach outputs a virtual Boolean Circuit for average (based on full-adders) and median (based on bubble sort as suitable sorting algorithm, i.e., content-independent number of invariants). One can further push the total number of gates (thus, running time) by addressing the circumstance of many PPIs representing percentage values and limiting inputs to seven (7) bits of length.

Example 15—Example Use Cases

An offering such as SAP Signavio Process Insights provides cloud applications for business process management and analytics. A benchmarking service that collects and connects data from the business process cloud applications realizes additional value. However, the envisioned benchmarking service accumulates a vast amount of confidential data, thus extending the threat surface towards adversaries, and potentially requires additional consent. The proposed technologies can reduce such a threat surface.

Example 16—Example Architecture Overview

In any of the examples, herein, the technologies can be implemented in an architecture that centralizes benchmark computation and employs threshold cryptography. So, for example, instead of requiring active participation by a computing performance provider in the homomorphic computations, such computations can be performed centrally at an HE aggregation service as described herein. Threshold cryptography (e.g., cascaded decryption) as described herein can be used in concert with such an approach so that multiple parties are involved in decryption. Such an approach not only shifts computational burden from the computing performance provider, but also improves scalability.

For example, two services with two private keys (e.g., a benchmarking service and an independent decryption service) can support a benchmark computation involving a large number of computing performance providers. Either of the parties can implement the actual HE aggregation service if desired. The benchmarking service can incorporate the HE aggregation service, and the independent decryption service can serve a simple role of performing decryption. In either case, the computing performance provider is relieved of having to implement the homomorphic cryptography computations related to aggregation.

Example 17—Example Architecture Detail

Figure 5:
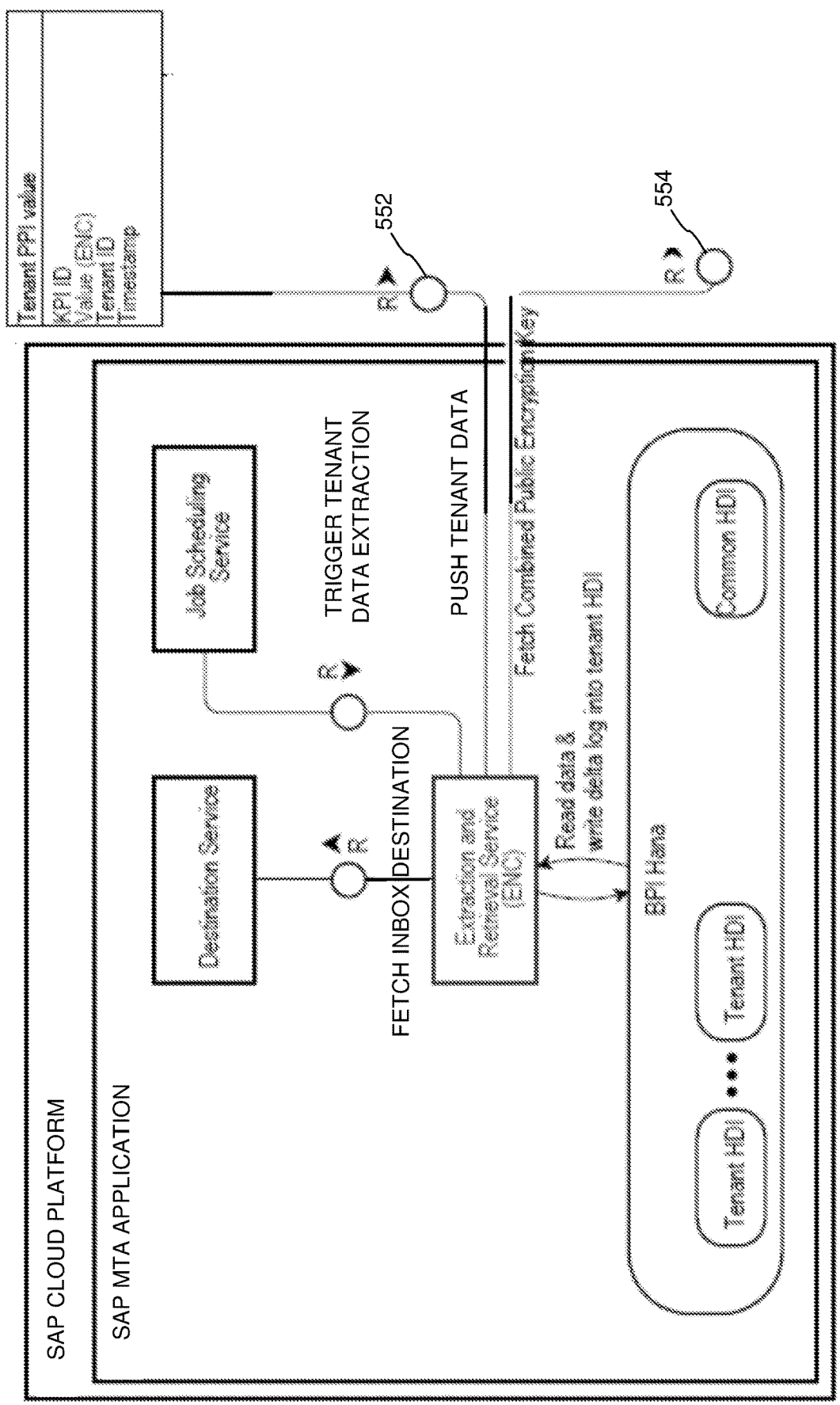
FIGS. 5, 6, and 7 are a block diagram of an example detailed architecture.
Figure 6:
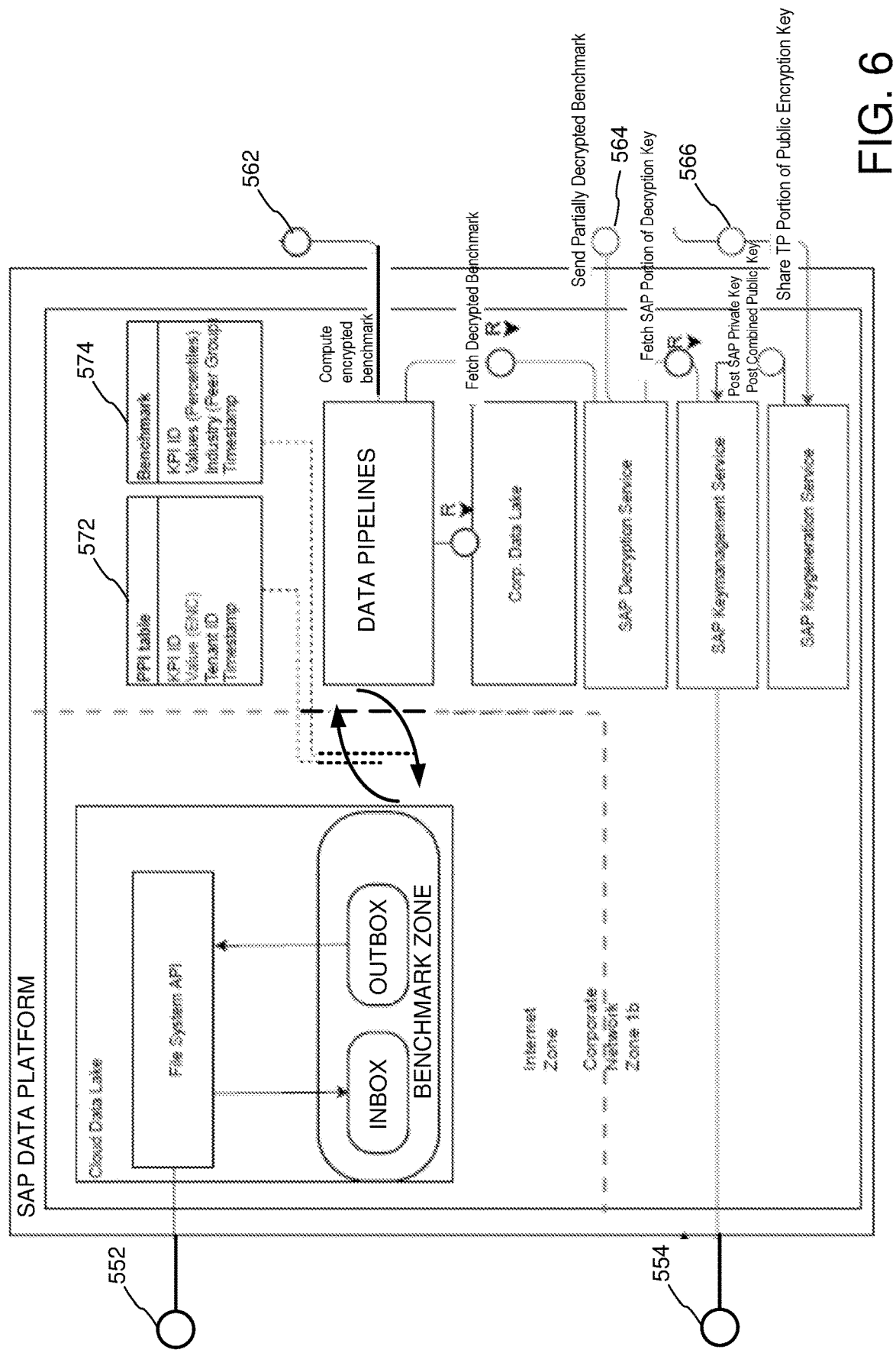
Figure 7:
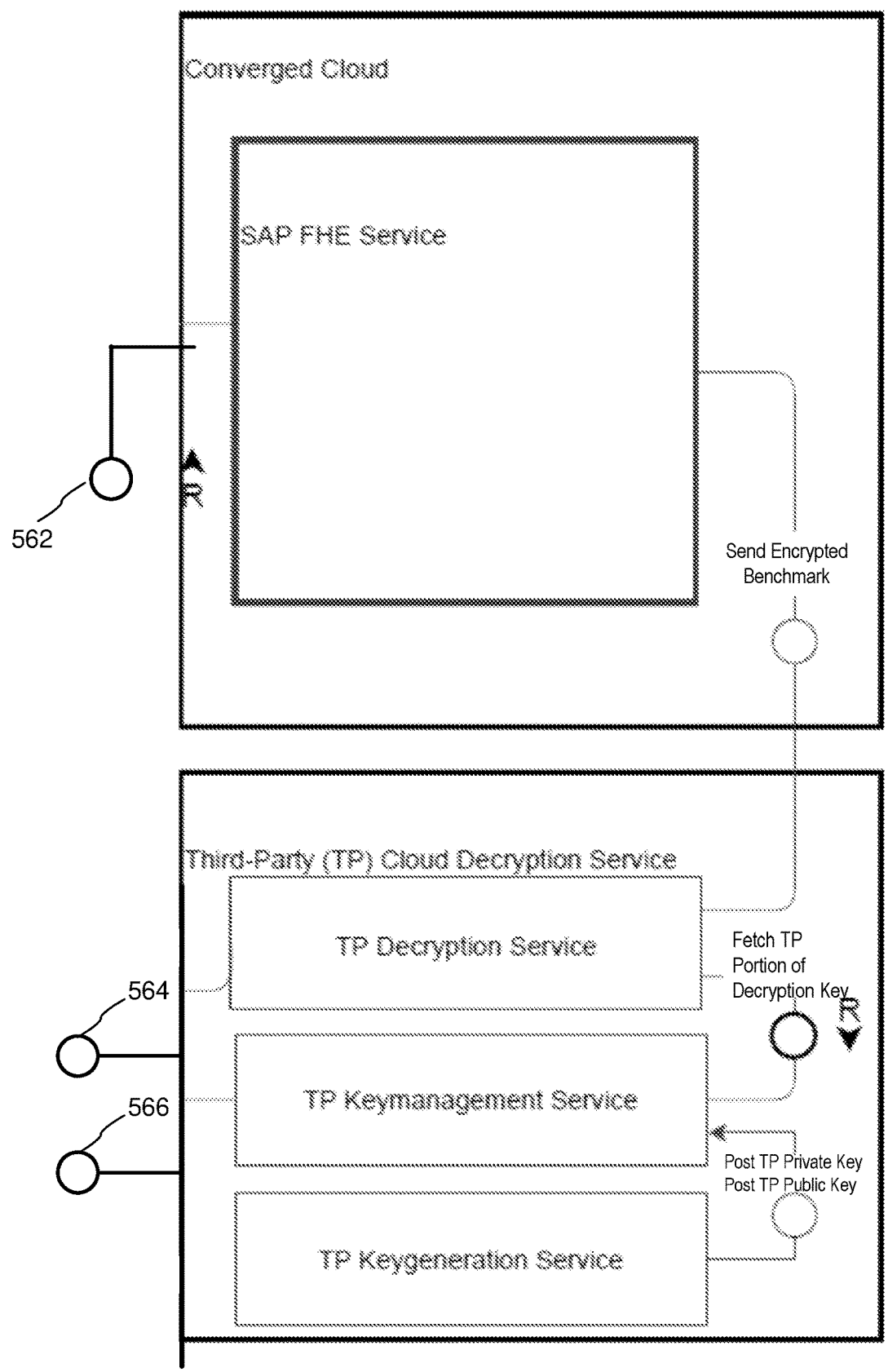

An example detailed architecture is shown in FIGS. 5, 6, and 7. The technical architecture modeling diagram illustrates how data can be generated and encrypted in the customer tenant, stored, aggregated, decrypted by the data platform in conjunction with HE Service and Third-Party (TP) decryption services (e.g., an independent decryption service), and ultimately sent to clients (e.g., the customer tenants).

MTA means multi-tenant application. BPI means business process intelligence (describes the field of process performance comparison and improvement). BTP means the SAP Business Technology Platform (any product for running a SaaS can be used). HDI means SAP HANA deployment infrastructure (any database offering can be used). The PPI table can store process performance indicators, or other computing performance metrics. The Value (ENC) can be encrypted as indicated by "ENC." The other columns need not be encrypted and instead provide metadata input for the benchmark (e.g., a benchmark is created for one KPI ID). Although an FHE (fully homomorphic encryption) implementation is shown in some examples, a partially (or semi) homomorphic encryption implementation can be realized. The benchmark zone shows storage organization within the data lake and can serve as a folder.

The corporate data lake can be used to enrich the benchmarks with further master data (e.g., determining the industry for a tenant) to build the peer groups described herein. The data pipelines can access the corporate data lake before the actual encrypted benchmark computation is triggered.

Connections 552, 554, 562, 564, and 566 can be used to communicate within the system as shown.

The read/write lines from the cloud data lake to the data pipelines are connected with the PPI table 572 (read from inbox) and benchmark table 574 (written to outbox). The PPI table 572 and benchmark table 574 show data that is communicated between the benchmark zone and the data pipelines.

In the example, a company "SAP" serves as a benchmarking service and provides services to number of customers as part of an SAP MTA Application (e.g., on the Signavio platform or other platform) that can manage computing performance metrics (PPIs). A third party ("TP") serves as an independent decryption service.

The tenant PPI values can be communicated as shown in a data structure comprising a KPI ID (metric identifier), value (encrypted metric value), tenant identifier (of the enterprise serving as the computing performance provider), and timestamp. Such an example data structure can be used in any of the examples herein.

Example 18—Example Implementations

Any of the following can be implemented.
Clause 1. A computer-implemented method comprising:
from a plurality of computing performance providers, receiving a plurality of encrypted computing performance metrics, wherein the encrypted performance metrics are encrypted according to a threshold homomorphic encryption scheme in which at least a benchmarking service and an independent decryption service contribute public encryption keys;

aggregating the plurality of encrypted computing performance metrics while sustaining the threshold homomorphic encryption scheme, wherein the aggregating generates an encrypted aggregated computing performance metric benchmark encrypted according to the threshold homomorphic encryption scheme; and sending the encrypted aggregated computing performance metric benchmark to an independent decryption service server, wherein the independent decryption service server is configured to partially decrypt the encrypted aggregated computing performance metric benchmark with a private key of the independent decryption service and relay the partially decrypted aggregated computing performance metric benchmark to the benchmarking service.

Clause 2. The method of Clause 1, further comprising:
fully decrypting the aggregated computing performance metric benchmark; and
over a network, sending the fully decrypted aggregated computing performance metric benchmark to at least one of the computing performance providers.

Clause 3. The method of Clause 2, wherein:
the encrypted computing performance metrics comprise respective encrypted versions of plaintext computing performance metrics; and
the method further comprises:
comparing the fully decrypted aggregated computing performance metric benchmark with a plaintext computing performance metric out of the plaintext computing performance metrics; and
responsive to determining that the fully decrypted aggregated computing performance metric benchmark differs from the plaintext computing performance metric by at least a threshold, sending an alert.

Clause 4. The method of any one of Clauses 1-3, wherein:
aggregating the plurality of encrypted computing performance metrics comprises applying bootstrapping during an aggregation calculation.

Clause 5. The method of any one of Clauses 1-4, wherein:
aggregating the plurality of encrypted computing performance metrics comprises applying a virtual Boolean circuit to the plurality of encrypted computing performance metrics, wherein the virtual Boolean circuit produces the encrypted aggregated computing performance metric benchmark as an output via a bitwise operation.

Clause 6. The method of Clause 5, wherein:
the plurality of encrypted computing performance metrics are represented in an n-bit format for the bitwise operation; and
n has a value between 5 and 10, inclusive.

Clause 7. The method of Clause 6, wherein:
n has a value of 7.

Clause 8. The method of any one of Clauses 6-7, wherein:
the plurality of encrypted computing performance metrics are represented as percentages.

Clause 9. The method of any one of Clauses 1-8, wherein:
aggregating the plurality of encrypted computing performance metrics comprises applying a virtual Boolean circuit definition that sustains the threshold homomorphic encryption scheme in the encrypted aggregated computing performance metric benchmark.

Clause 10. The method of any one of Clauses 1-9, wherein:
aggregating the plurality of encrypted computing performance metrics comprises calculating an average or median with a bitwise operation on the plurality of encrypted computing performance metrics.

Clause 11. The method of Clause 10, wherein:
calculating the average with the bitwise operation comprises applying a definition of a virtual Boolean circuit in a homomorphic encryption calculation.

Clause 12. The method of any one of Clauses 1-11, wherein:
the plurality of encrypted computing performance metrics are encrypted with a combined key based on at least a public key of the benchmarking service and a public key of the independent decryption service.

Clause 13. The method of any one of Clauses 1-12, wherein:
the encrypted computing performance metrics comprise encrypted process performance indicators.

Clause 14. The method of any one of Clauses 1-13, wherein:
one or more additional independent decryption services are configured to partially decrypt the encrypted aggregated computing performance metric benchmark with respective private keys of the one or more additional independent decryption services and relay the partially decrypted aggregated computing performance metric benchmark to a next decrypting party in a chain of decrypting decryptors.

Clause 15. A system comprising:
a benchmarking service configured to receive a plurality of encrypted computing performance metrics, wherein the encrypted computing performance metrics are encrypted according to a threshold homomorphic encryption scheme in which at least a benchmarking service and an independent decryption service contribute public encryption keys;
a homomorphic encryption aggregation service configured to aggregate the encrypted computing performance metrics while sustaining the threshold homomorphic encryption scheme, wherein the aggregating generates an encrypted aggregated computing performance metric benchmark encrypted according to the threshold homomorphic encryption scheme; and
an independent decryption service configured to partially decrypt the encrypted aggregated computing performance metric benchmark with a private key of the independent decryption service and relay the partially decrypted aggregated computing performance metric benchmark to the benchmarking service;
wherein the benchmarking service is further configured to fully decrypt the partially decrypted aggregated computing performance metric benchmark, and, over a network, send the fully decrypted aggregated computing performance metric benchmark to one or more computing performance providers.

Clause 16. The system of Clause 15 wherein:
the encrypted computing performance metrics comprise respective encrypted versions of plaintext computing performance metrics; and
at least one of the one or more computing performance providers is configured to:
compare the fully decrypted aggregated computing performance metric benchmark with a plaintext computing performance metric out of the plaintext computing performance metrics; and
responsive to determining that the fully decrypted aggregated computing performance metric benchmark differs from the plaintext computing performance metric by at least a threshold, send an alert.

Clause 17. The system of any one of Clauses 15-16 wherein:
a homomorphic encryption aggregation service comprises a virtual Boolean circuit that accepts the encrypted computing performance metrics as input; and
the virtual Boolean circuit outputs the encrypted aggregated computing performance metric benchmark as the result of a bitwise operation while sustaining encryption.

Clause 18. The system of Clause 17 wherein:
the plurality of encrypted computing performance metrics are represented in an n-bit format for the bitwise operation; and
n has a value between 5 and 10, inclusive.

Clause 19. The system of Clause 18 wherein:
n has a value of 7.

Clause 20. One or more non-transitory computer-readable media storing computer instructions that when executed by a computing system cause the computing system to perform operations comprising:
from a plurality of computing performance providers, receiving a plurality of encrypted computing performance metrics, wherein the encrypted computing performance metrics are encrypted according to a threshold fully homomorphic encryption scheme in which at least a benchmarking service and an independent decryption service contribute public encryption keys;
aggregating the plurality of encrypted computing performance metrics while sustaining the threshold fully homomorphic encryption scheme, wherein the aggregating generates an encrypted aggregated computing performance metric benchmark encrypted according to the threshold fully homomorphic encryption scheme via a virtual Boolean circuit that performs a bitwise operation on the plurality of encrypted computing performance metrics; and
sending the encrypted aggregated computing performance metric benchmark to an independent decryption service server, wherein the independent decryption service server is configured to partially decrypt the encrypted aggregated computing performance metric benchmark with a private key of the independent decryption service and relay the partially decrypted aggregated computing performance metric benchmark to the benchmarking service.

Clause 21. One or more computer-readable media having encoded thereon computer-executable instructions that, when executed by a computing system, cause the computing system to perform the method of any one of Clauses 1-14.

Clause 22. A computing system comprising:
at least one hardware processor;
at least one memory coupled to the at least one hardware processor; and
one or more non-transitory computer-readable media having stored therein computer-executable instructions that, when executed by the computing system, cause the computing system to perform the method of any one of Clauses 1-14.

Example 19—Example Computing Systems

Figure 8:
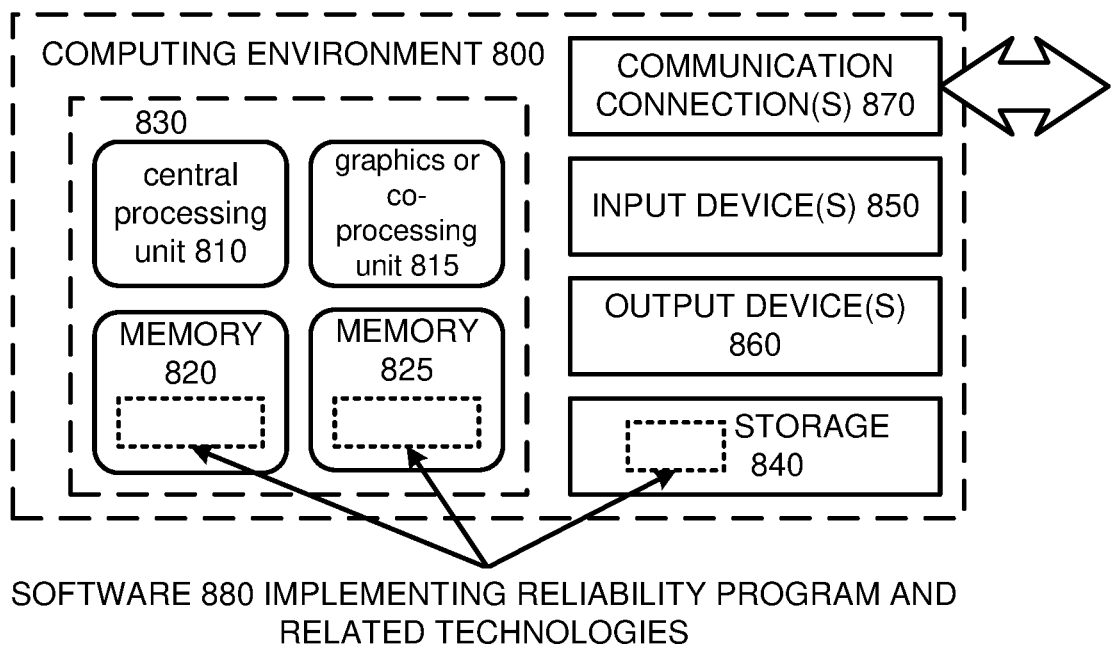
FIG. 8 is a block diagram of an example computing system in which described embodiments can be implemented.

FIG. 8 depicts an example of a suitable computing system 800 in which the described innovations can be implemented. The computing system 800 is not intended to suggest any limitation as to scope of use or functionality of the present disclosure, as the innovations can be implemented in diverse computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 can be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, for example, reliability program, in the form of computer-executable instructions suitable for execution by the processing unit(s) 810, 815.

A computing system 800 can have additional features. For example, the computing system 800 includes storage 840, one or more input devices 850, one or more output devices 860, and one or more communication connections 870, including input devices, output devices, and communication connections for interacting with a user. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 can be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 can be an input device such as a keyboard, mouse, pen, or trackball, a voice input device, a scanning device, touch device (e.g., touchpad, display, or the like) or another device that provides input to the computing system 800. The output device(s) 860 can be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 20—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 21—Example Cloud Computing Environment

Figure 9:
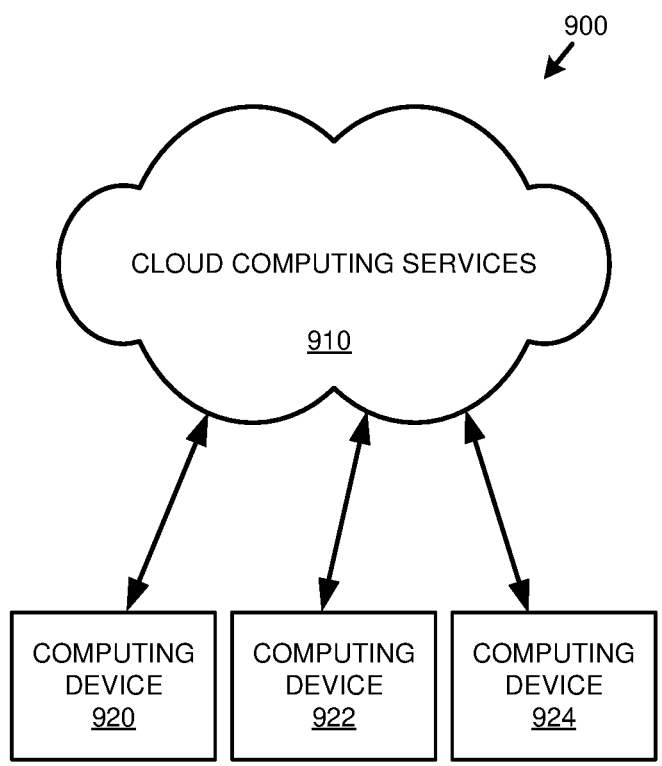
FIG. 9 is a block diagram of an example cloud computing environment that can be used in conjunction with the technologies described herein.

FIG. 9 depicts an example cloud computing environment 900 in which the described technologies can be implemented, including, e.g., the system 100 of FIG. 1 and other systems herein. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

In practice, cloud-based, on-premises-based, or hybrid scenarios can be supported.

Example 22—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 23—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
from a plurality of computing performance providers, receiving a plurality of encrypted computing performance metrics, wherein the encrypted performance metrics are encrypted according to a threshold homomorphic encryption scheme in which at least a benchmarking service and an independent decryption service contribute public encryption keys;
aggregating the plurality of encrypted computing performance metrics while sustaining the threshold homomorphic encryption scheme, wherein the aggregating generates an encrypted aggregated computing performance metric benchmark encrypted according to the threshold homomorphic encryption scheme; and
sending the encrypted aggregated computing performance metric benchmark to an independent decryption service server, wherein the independent decryption service server is configured to partially decrypt the encrypted aggregated computing performance metric benchmark with a private key of the independent decryption service and relay the partially decrypted aggregated computing performance metric benchmark to the benchmarking service.

2. The method of claim 1, further comprising:
fully decrypting the aggregated computing performance metric benchmark; and
over a network, sending the fully decrypted aggregated computing performance metric benchmark to at least one of the computing performance providers.

3. The method of claim 2, wherein:
the encrypted computing performance metrics comprise respective encrypted versions of plaintext computing performance metrics; and
the method further comprises:
comparing the fully decrypted aggregated computing performance metric benchmark with a plaintext computing performance metric out of the plaintext computing performance metrics; and
responsive to determining that the fully decrypted aggregated computing performance metric benchmark differs from the plaintext computing performance metric by at least a threshold, sending an alert.

4. The method of claim 1, wherein:
aggregating the plurality of encrypted computing performance metrics comprises applying bootstrapping during an aggregation calculation.

5. The method of claim 1, wherein:
aggregating the plurality of encrypted computing performance metrics comprises applying a virtual Boolean circuit to the plurality of encrypted computing performance metrics, wherein the virtual Boolean circuit produces the encrypted aggregated computing performance metric benchmark as an output via a bitwise operation.

6. The method of claim 5, wherein:
the plurality of encrypted computing performance metrics are represented in an n-bit format for the bitwise operation; and
n has a value between 5 and 10, inclusive.

7. The method of claim 6, wherein:
n has a value of 7.

8. The method of claim 6, wherein:
the plurality of encrypted computing performance metrics are represented as percentages.

9. The method of claim 1, wherein:
aggregating the plurality of encrypted computing performance metrics comprises applying a virtual Boolean circuit definition that sustains the threshold homomorphic encryption scheme in the encrypted aggregated computing performance metric benchmark.

10. The method of claim 1, wherein:
aggregating the plurality of encrypted computing performance metrics comprises calculating an average or median with a bitwise operation on the plurality of encrypted computing performance metrics.

11. The method of claim 10, wherein:
calculating the average with the bitwise operation comprises applying a definition of a virtual Boolean circuit in a homomorphic encryption calculation.

12. The method of claim 1, wherein:
the plurality of encrypted computing performance metrics are encrypted with a combined key based on at least a public key of the benchmarking service and a public key of the independent decryption service.

13. The method of claim 1, wherein:
the encrypted computing performance metrics comprise encrypted process performance indicators.

14. The method of claim 1, wherein:
one or more additional independent decryption services are configured to partially decrypt the encrypted aggregated computing performance metric benchmark with respective private keys of the one or more additional independent decryption services and relay the partially decrypted aggregated computing performance metric benchmark to a next decrypting party in a chain of decrypting decryptors.

15. A computing system comprising one or more hardware processors and respective memory for the one or more hardware processors, a given memory of the respective memory is coupled to one or multiple hardware processors of the one or more hardware processors, the computing system comprising:
a benchmarking service configured to receive a plurality of encrypted computing performance metrics, wherein the encrypted computing performance metrics are encrypted according to a threshold homomorphic encryption scheme in which at least a benchmarking service and an independent decryption service contribute public encryption keys;

a homomorphic encryption aggregation service configured to aggregate the encrypted computing performance metrics while sustaining the threshold homomorphic encryption scheme, wherein the aggregating generates an encrypted aggregated computing performance metric benchmark encrypted according to the threshold homomorphic encryption scheme; and
an independent decryption service configured to partially decrypt the encrypted aggregated computing performance metric benchmark with a private key of the independent decryption service and relay the partially decrypted aggregated computing performance metric benchmark to the benchmarking service;
wherein the benchmarking service is further configured to fully decrypt the partially decrypted aggregated computing performance metric benchmark, and, over a network, send the fully decrypted aggregated computing performance metric benchmark to one or more computing performance providers.

16. The system of claim 15 wherein:
the encrypted computing performance metrics comprise respective encrypted versions of plaintext computing performance metrics; and
at least one of the one or more computing performance providers is configured to:
compare the fully decrypted aggregated computing performance metric benchmark with a plaintext computing performance metric out of the plaintext computing performance metrics; and
responsive to determining that the fully decrypted aggregated computing performance metric benchmark differs from the plaintext computing performance metric by at least a threshold, send an alert.

17. The system of claim 15 wherein:
a homomorphic encryption aggregation service comprises a virtual Boolean circuit that accepts the encrypted computing performance metrics as input; and
the virtual Boolean circuit outputs the encrypted aggregated computing performance metric benchmark as the result of a bitwise operation while sustaining encryption.

18. The system of claim 17 wherein:
the plurality of encrypted computing performance metrics are represented in an n-bit format for the bitwise operation; and
n has a value between 5 and 10, inclusive.

19. The system of claim 18 wherein:
n has a value of 7.

20. One or more non-transitory computer-readable media storing computer instructions that when executed by a computing system cause the computing system to perform operations comprising:
from a plurality of computing performance providers, receiving a plurality of encrypted computing performance metrics, wherein the encrypted computing performance metrics are encrypted according to a threshold fully homomorphic encryption scheme in which at least a benchmarking service and an independent decryption service contribute public encryption keys;
aggregating the plurality of encrypted computing performance metrics while sustaining the threshold fully homomorphic encryption scheme, wherein the aggregating generates an encrypted aggregated computing performance metric benchmark encrypted according to the threshold fully homomorphic encryption scheme via a virtual Boolean circuit that performs a bitwise operation on the plurality of encrypted computing performance metrics; and sending the encrypted aggregated computing performance metric benchmark to an independent decryption service server, wherein the independent decryption service server is configured to partially decrypt the encrypted aggregated computing performance metric benchmark with a private key of the independent decryption service and relay the partially decrypted aggregated computing performance metric benchmark to the benchmarking service.

* * * * *